(12) United States Patent
Thoms

(10) Patent No.: US 7,121,297 B2
(45) Date of Patent: Oct. 17, 2006

(54) VALVE ARRANGEMENT IN A HYDRAULIC CIRCUIT, USE OF THE SAME AND ARRANGEMENT FOR CONTROLLING A HYDRAULIC VEHICLE DRIVE

(75) Inventor: Reinhardt Thoms, Neumunster (DE)

(73) Assignee: Sauer-Danfoss Inc., Ames, IA (US)

( * ) Notice: Subject to any disclaimer, the term of this patent is extended or adjusted under 35 U.S.C. 154(b) by 22 days.

(21) Appl. No.: 11/060,837

(22) Filed: Feb. 18, 2005

(65) Prior Publication Data

US 2005/0211302 A1    Sep. 29, 2005

(30) Foreign Application Priority Data

Mar. 26, 2004   (DE)   ................... 10 2004 015 012

(51) Int. Cl.
*F16K 31/36*  (2006.01)
(52) U.S. Cl. ............... 137/489; 137/489.5; 137/493.7; 251/63.6; 60/466
(58) Field of Classification Search ............... 137/489, 137/493, 493.7, 488, 485, 489.5; 251/63.6, 251/83; 60/466
See application file for complete search history.

(56) References Cited

U.S. PATENT DOCUMENTS

| | | | | |
|---|---|---|---|---|
| 1,091,536 A | * | 3/1914 | Ross | ............... 137/489 |
| 3,044,485 A | * | 7/1962 | Adams et al. | ............... 137/493.7 |
| 5,167,291 A | * | 12/1992 | Mann | ............... 180/6.3 |
| 6,338,247 B1 | * | 1/2002 | Drin | ............... 60/466 |

* cited by examiner

*Primary Examiner*—Eric Keasel
*Assistant Examiner*—Craig M. Schneider

(57) ABSTRACT

Arranged in a hydraulic circuit is a valve with an L-shaped duct arrangement, which is formed by a transverse duct 2 and a longitudinal duct 3. Formed in extension of the longitudinal duct 3 is a holding and guiding bore 4, in which a throttling element, comprising a throttle slide 10 and a valve piston 21 that can be displaced therein, can be displaced longitudinally. The valve piston 21 has a passage hole 25, which is connected to the interior of the throttling element and two proportionate annular chambers 17a and 17b. Of these, the proportionate annular chamber 17b is connected to a pilot control valve via a control duct 19. Depending on the direction and pressure of the hydraulic fluid flowing through the L-shaped duct arrangement, the throttling element is moved in or out and extended or compressed in the process. In this way, the valve arrangement acts as a throttling valve in the event of flow in the direction from the transverse duct 2 to the longitudinal duct 3, while the flow in the opposite flow direction is not throttled.

20 Claims, 4 Drawing Sheets

VALVE ARRANGEMENT IN A HYDRAULIC CIRCUIT, USE OF THE SAME AND ARRANGEMENT FOR CONTROLLING A HYDRAULIC VEHICLE DRIVE

BACKGROUND AND SUMMARY OF THE INVENTION

The invention relates to a valve arrangement in a hydraulic circuit, its use and also an arrangement for controlling a hydraulic vehicle drive.

In hydraulic control systems there is a need for a valve arrangement which acts as a throttling valve when the pressure of the hydraulic fluid flowing through exceeds a specific threshold value. One important application of this is arrangements for controlling hydraulic vehicle drives. The latter generally have a closed hydraulic circuit which has a variable displacement pump driven by a diesel engine, a hydraulic motor driving the drive wheels of the vehicle and two lines connecting the variable displacement pump and the hydraulic motor for the hydraulic fluid, it being possible for each of the lines, depending on the direction of travel of the vehicle, to be the flow or the return line for the hydraulic motor (DE 199 30 997 A1). In hydraulic circuits of this type, the hydraulic motor can act as a pump when the vehicle changes from the normal driven state to trailing or overrun operation. The vehicle then attempts to accelerate the variable displacement pump and therefore also the diesel engine, which can lead to damage to the diesel engine.

For this reason, it has already been proposed, according to DE 199 30 997 A1, to insert into the return line of the hydraulic circuit a pressure regulating valve which acts as a throttle and which acts in the event of increased pressure of the hydraulic fluid flowing from the hydraulic motor to the variable displacement pump. In the pressure regulating valve acting as a throttle, the energy of the hydraulic fluid flowing from the hydraulic motor to the variable displacement pump is partly converted into heat, which means that further undesired overrunning of the diesel engine is prevented. If, during normal driving operation, the usual lower pressures are present in the return line, the throttling action remains nonfunctional. However, if the direction of travel of the vehicle is reversed, the return line then has to serve as a flow line, which is under increased pressure and in which a throttling action would be undesirable. For this reason, in the known vehicle drive according to DE 199 30 997 A1, a line with a nonreturn valve is provided in parallel with the valve arrangement, so that the pressure regulating valve remains inactive when the flow direction is reversed. If it is intended to secure the vehicle against overrunning of the diesel engine in both directions of travel, then the arrangement described of the pressure regulating valve with the parallel-connected nonreturn valve is required in a dual arrangement. This parallel connection of the two functions by means of valves which are designed separately and independently of each other needs a great deal of installation space or leads to a restriction of the flow cross sections, associated with corresponding hydraulic-mechanical power losses.

The invention is therefore based on the object of providing a valve arrangement which acts as a throttle in only one flow direction, with which installation space is saved and at the same time the effort for mounting is reduced, in addition the greatest possible flow cross sections becoming possible in a small available installation space.

According to the invention, this object is achieved in by a valve arrangement in a hydraulic circuit, having an L-shaped duct arrangement, in which a throttling element whose length can be adjusted can be displaced in the direction of one arm of the L-shaped duct arrangement in accordance with the position of a pilot control valve, the adjustment of the length of the throttling element being made under the influence of the pressure of the hydraulic fluid entering its interior and the design being such that the throttling element is pushed into the duct arrangement when a specific threshold pressure of the hydraulic fluid is exceeded, irrespective of the flow direction of the hydraulic fluid, but its length is shortened when the inflow to its end takes place at a pressure higher than the threshold pressure.

The valve arrangement according to the invention is distinguished by the fact that hydraulic fluid under increased pressure can flow through it in both flow directions but a throttling action occurs only in one flow direction. The throttling action does not occur if the inflow against the adjustable length throttling element is from one end. In this case, the throttling element automatically adjusts to a shorter length. A throttling action is prevented if, in accordance with the increased pressure of the hydraulic fluid, the throttling element assumes its extended position overall. In this way, a line led in parallel and having a nonreturn valve can be saved.

With the valve arrangement according to the invention, the same action is thus achieved as with the nonreturn valve located in a bypass line in an arrangement according to the prior art. However, the outlay on construction is lower; space is saved and larger flow cross sections can be implemented.

The fact that a pilot control valve is provided in the valve arrangement according to the invention presents no obstacle to this, since the said pilot control valve is expedient in any case for registering a specific threshold pressure of the hydraulic fluid.

Advantageous refinements and structural details of the valve arrangement according to the invention are specified in the claims that refer back.

The invention also covers the use of a valve arrangement in a closed circuit of a hydraulic drive.

In this case, this can be, for example, the drive of a machine tool which is equipped with a hydraulic transmission. A particularly preferred field of application of the valve arrangement according to the invention is, however, vehicle drives. Therefore, the invention also extends to the arrangement for controlling a hydraulic vehicle drive.

The arrangement for controlling a hydraulic vehicle drive, according to the invention, comprises a closed hydraulic circuit which has a variable displacement pump driven by a diesel engine, a hydraulic motor driving the drive wheels of the vehicle and lines connecting the variable displacement pump and the hydraulic motor for the hydraulic fluid, it being possible for each of the lines to be the flow or return line of the hydraulic motor, depending on the direction of travel of the vehicle, a valve arrangement being provided in at least one of the lines.

If the vehicle is to be secured against impermissibly high rotational speeds of the diesel engine in overrun operation in both directions of travel, a valve arrangement according to the invention must be incorporated in each of the lines.

BRIEF DESCRIPTION OF THE FIGURES

The invention will be explained in more detail below using exemplary embodiments illustrated in the figures, in which.

DETAILED DESCRIPTION OF THE PREFERRED EMBODIMENT

Figure 1:
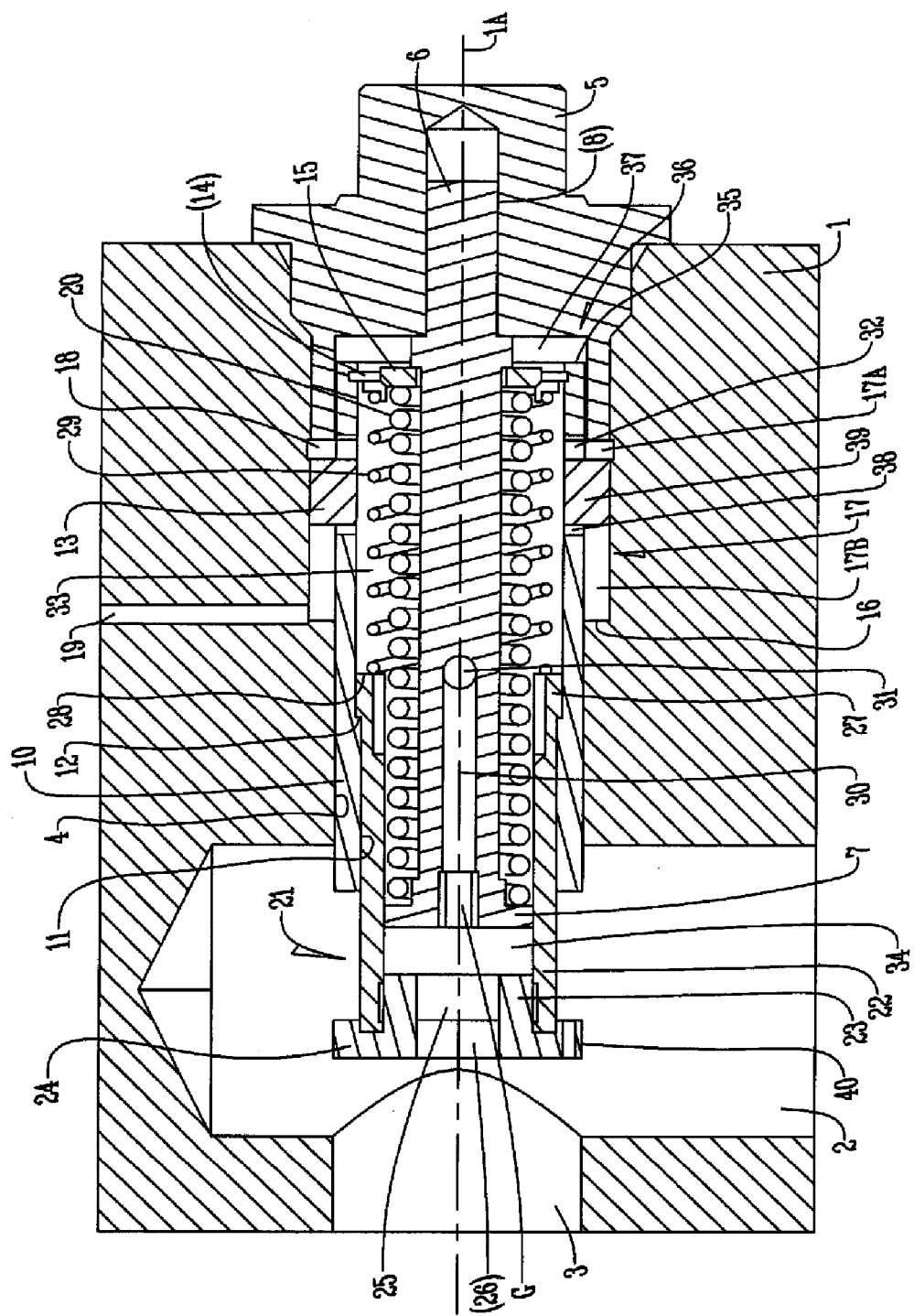
FIG. 1 shows the valve arrangement according to the invention in a longitudinal section, the arrangement being in its initial position.

In FIG. 1, the number 1 designates a stationary part which, in the illustration selected here, can be a separate housing, for example. However, the stationary part can be formed by a machine housing itself, for example the housing of an axial piston machine, the remaining parts then being incorporated directly in the housing of the machine. In the stationary part 1, the longitudinal axis 1a defines an axial direction which is important for the description of the valve arrangement. Transversely with respect to the longitudinal axis 1a, a transverse duct 2 runs in the stationary part 1, and arranged in the direction of the longitudinal axis 1a is the longitudinal duct 3, which is connected to the said transverse duct 2. The transverse duct 2 and the longitudinal duct 3 run at right angles to each other in the manner of an L. A preferred field of application of this valve arrangement is the hydraulic circuit for driving a vehicle, as will be explained in more detail later. In this application, the longitudinal duct 3 is connected to a hydraulic variable displacement pump, while the transverse duct 2 is connected to the hydraulic motor of a vehicle.

Provided on the same axis as the longitudinal duct 3, that is to say likewise in the direction of the longitudinal axis 1a, is a holding and guiding bore 4, which is used for the installation of the valve arrangement. The holding and guiding bore 4 is closed off from the outside in a pressure-tight manner by a closure screw 5.

Screwed into the closure screw 5 by means of a screw thread 8 is a tie rod 6. The latter projects into the region of the transverse duct 2 and, at its end already located in the transverse duct 2, is designed as a spring disc 7. Provided in the spring disc 7 is an opening in the form of a polygonal profile 9 which is used when the tie rod 6 is screwed into the closure screw 5.

In the holding and guiding bore 4, a throttle slide 10 is arranged such that it can be displaced longitudinally. The throttle slide 10 has approximately the shape of a cylindrical tube, that is to say has an internal bore 11. The internal bore 11 is provided with a step at 12, whose significance will be explained later.

Figure 2:
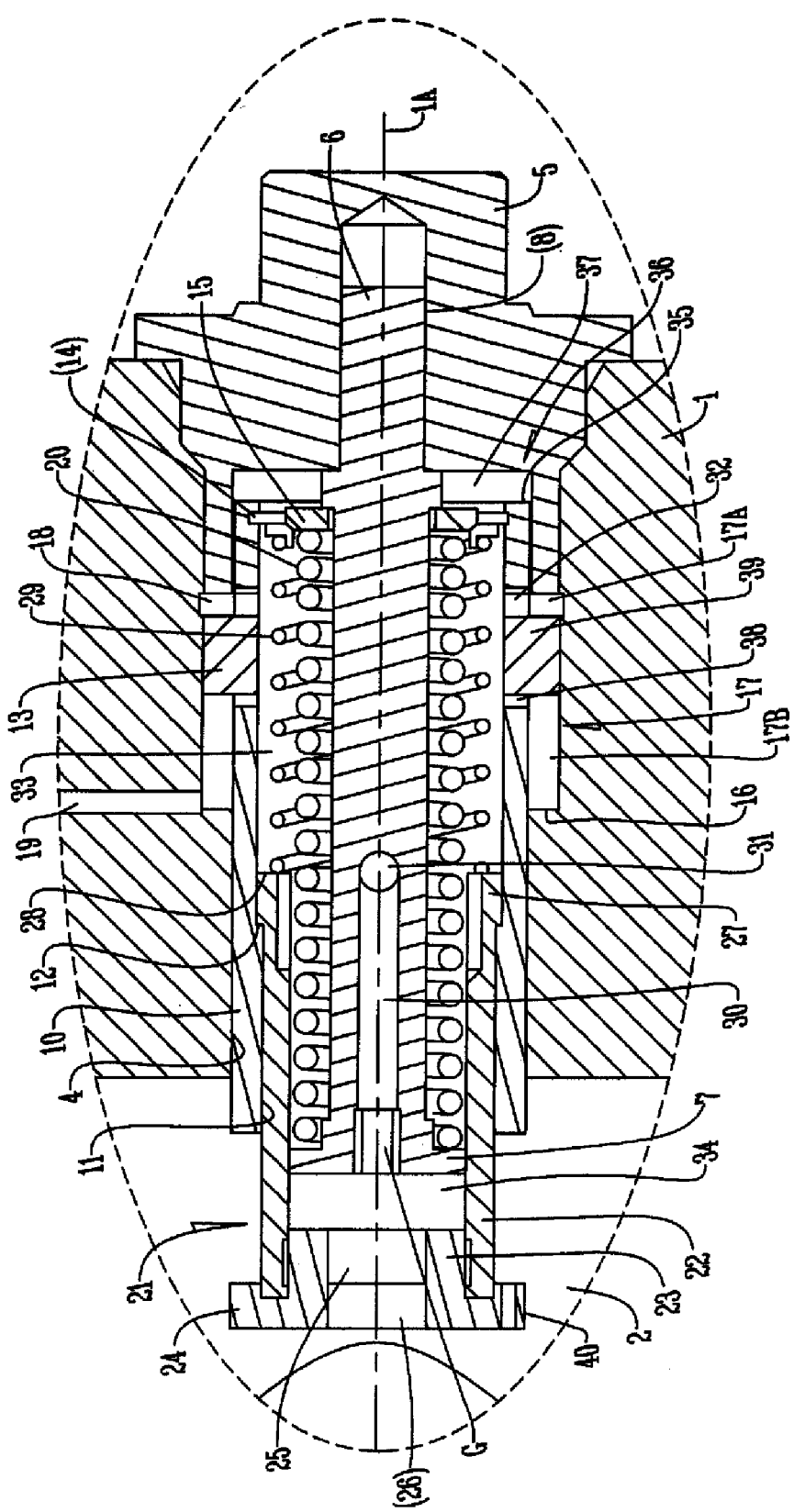
FIG. 2 is a detail from FIG. 1 on an enlarged scale.

In the region of the throttle slide 10 facing the closure screw 5, a control flange 13 is arranged on the outside of the said throttle slide 10. The control flange 13 has two control faces 13a and 13b (FIG. 2). Of these, the control face 13a faces the closure screw 5, while the control face 13b is located opposite and thus faces the transverse duct 2. At its end facing the closure screw 5, the internal bore 11 of the throttle slide 10 is provided with a groove, into which a securing ring 14 is inserted. The securing ring 14 serves as a stop for a multiple spring disc 15.

The holding and guiding bore 4 does not have a constant diameter over its entire length. Instead, in the region facing the closure screw 5, the diameter of the holding and guiding bore 4 is enlarged considerably, which means that an annular stop 16 is formed. When the throttle slide 10 is inserted, an annular chamber 17 is formed between it and the region of the holding and guiding bore 4 of enlarged diameter. The displacement travel of the throttle slide 10 towards the outside, in the direction of the longitudinal duct 3, is limited by the control flange 13. This is because, in this direction, the control face 13b comes into contact with the annular stop 16.

The control flange 13 of the throttle slide 10 subdivides the annular chamber 17 into two proportionate annular chambers 17a and 17b. Of these, the proportionate annular chamber 17a is arranged on the side of the closure screw 5, while the proportionate annular chamber 17b is located on the opposite side of the control flange 13, that is to say is oriented towards the side of the valve piston 21. The proportionate annular chamber 17b is connected via a control duct 19 to a pressure limiting valve, which serves as a pilot control valve. The control duct 19 opens into the proportionate annular chamber 17b in the region of the annular step 16.

Arranged so as to surround the tie rod 6 concentrically is a slide spring 20, which is formed as a helical spring. The slide spring 20 strikes the multiple spring disc 15 with its one end and the spring disc 7 of the tie rod 6 with its other end. The prestress of the slide spring 20 can be set differently by screwing the tie rod 6 in the closure screw 5. As a result of the prestress of the slide spring 20, the throttle slide 10 attempts to move back in the holding and guiding bore 4 until it strikes the closure screw 5. In order that this is possible, there is a circularly cylindrical recess 35 (FIG. 3) in the closure screw 5. The part of the throttle slide 10 that projects beyond the control flange 13 can move into this circularly cylindrical recess.

The circularly cylindrical recess 35 forms an annular end face 18 and an inner face 37 in the closure screw 5. When the throttle slide 10 moves into the circularly cylindrical recess 35 in the closure screw 5, the annular end face 36 of the throttle slide 10 strikes the inner face 37 of the closure screw 5. However, the formation can also be such that the stop is provided by the control face 13a of the control flange 13 on the annular end face 18 of the closure screw 5.

The valve piston 21 slides concentrically in the internal bore 11 of the throttle slide 10. Throttle slide 10 and valve piston 21 are the main parts of the throttling element, and to a certain extent form a telescopic tube. The valve piston 21 comprises a tubular stem 22, which has substantially the form of a cylindrical tubular piece. Screwed into the tubular stem 22 is a piston crown 23, as a result of which the valve piston 21 is given approximately the shape of a beaker overall. The piston crown 23 is formed as a closure plate 24 at its outer end. The closure plate 24 has a contour matched to the cross section of the branch duct 3. The dimensions are chosen such that the closure plate 24 can enter the opening in the branch duct 3 and can largely close the latter. However, the piston crown 23 is provided with a passage hole 25, so that there is a connection between the chamber upstream of the closure plate 24 and the interior 34 of the valve piston. Part of the passage hole 25 is also provided with a profiled cross section 26 here, into which a tool can be inserted in order to screw the piston crown 25 into the tubular stem 22.

At its inner end, facing the closure screw 5, the tubular stem 22 of the valve piston 21 is provided with a stop collar 27. This stop collar comes into contact with the step 12 already mentioned on the internal bore 11, by which means the longitudinal movement of the valve piston 21 is limited.

The valve piston 21 is under the action of the valve piston spring 29, which acts on the inner end face 28 of the valve piston 21. At its opposite end, the valve piston spring 29 is supported on the multiple valve disc 15. The valve piston spring 29 is also formed as a helical spring. Reckoned from the inside to the outside, the tie rod 6, the slide spring 20, the valve piston spring 29 and the tubular stem 22 and the throttle slide 10 are thus arranged concentrically and are such that they can move with respect to one another in the longitudinal direction.

For the control of the valve arrangement according to the invention, a series of passage openings or holes is important, which will now be described in detail and emerge particularly clearly from the enlarged illustration according to FIG. 2. In principle, even when the valve plate 24 is moved into the longitudinal duct 3, as shown in the FIG. 3, there is a continuous hydraulic connection from the longitudinal duct 3 as far as the proportionate annular chambers 17a and 17b, and also to the control duct 19. This connection begins with the passage hole 25 which has already been mentioned and in some sections is provided with a profiled cross section 26. The passage hole 25 initially creates a connection between the longitudinal duct 3 and the interior 34 of the valve piston 21.

The polygonal profile 9 already mentioned in the valve disc 7 of the tie rod 6 forms part of a longitudinal bore 30, which is connected to a transverse bore 31. In this way, the interior 34 of the valve piston 21 is connected to the interior 33 of the throttle slide 10. Transverse bores 32 in the wall of the throttle slide 10 then connect the interior 33 of the throttle slide 10 at least to the upper proportionate annular chamber 17a in FIG. 2.

A connection to the lower proportionate annular chamber 17b in FIG. 2 as well can, for example, be produced by radial openings 38 in the wall of the throttle slide 10. In this way, a direct connection is produced between the proportionate annular chamber 17b and the interior 33 of the throttle slide. However, the connection to the proportionate annular chamber 17b can also be made indirectly via the proportionate annular chamber 17a, by the radial play between the control flange 13 of the throttle slide 10 and the internal diameter of the annular chamber 17, which forms the holding and guiding bore 4 at this point, being set specifically. This measure can be reinforced by axial openings 39 in the control flange 13. Each of the possible ways of connecting the proportionate annular chamber 17b hydraulically to the longitudinal duct 3 is possible on its own or in conjunction with the others.

The radial openings 38, the axial openings 39 and the radial play between the control flange 13 and the internal diameter of the annular chamber 17 can thus each be provided on its own or together with the other possible connections. The control duct 19 is then connected to the proportionate annular chamber 17b.

Furthermore, some diameter variables are of particular importance for the function of the valve arrangement according to the invention. These include the internal diameter $D_4$ of the holding and guiding bore 4 and the external diameter $D_{10}$ equal thereto, of the throttle slide 10 in the region of the transverse duct 2 (FIG. 2), also the internal diameter $D_{11}$ of the throttle slide 10, the external diameter $D_{13}$ of the control flange 13 and the diameter $D_{24}$ of the closure plate 24. The diameters $D_{24}$ and $D_{10}$ are in general of the same size. Then, given a specific pressure in the transverse duct 2, the two parts 10 and 21 of the telescopic tube are extended to the maximum, so that the step 12 of the throttle slide 10 is drawn against the stop collar 27 of the valve piston 21. As a result, the forces resulting from the pressure in the transverse duct 2, which act on the throttle slide 10 and on the valve piston 21, cancel each other out on this stop collar 27. Consequently, a change in this position is to be expected only as a result of the pressures prevailing in the interior of the telescopic tube.

In principle, it is possible to state that the position of the throttle slide 10 in its holding and guiding bore 4 is primarily determined by whether the pressure limiting valve connected to the control duct 19 has opened or not. The position of the valve piston with respect to the throttle slide 10, on the other hand, results from the pressure difference of the hydraulic fluid in the region of the longitudinal duct 3 and the transverse duct 2.

In detail, the valve arrangement described operates as follows.

FIG. 1 shows the initial state of the valve arrangement. The throttle slide 10 has retracted inwards into the closure screw 5 to the maximum extent under the influence of the slide spring 20. The valve piston 21, on the other hand, is extended from the throttle slide 10 to the maximum extent by the valve piston spring 29. The pressure limiting valve connected to the control duct 19 is initially closed. This initial position is maintained as long as the pressures in the transverse duct 2 and therefore in the longitudinal duct 3 are approximately equally high and do not exceed a specific threshold value. The initial position is in this case also independent of the direction in which flow takes place through the valve arrangement.

The case will now be considered in which hydraulic fluid flows through the transverse duct 2 to the longitudinal duct 3 under increased pressure. The increased pressure of the hydraulic fluid will act in the manner outlined from the passage opening hole 25, 26 of the piston crown 23 as far as the proportionate annular chambers 17a and 17b and the control duct. Ultimately, the response pressure of the pressure limiting valve is reached, and the latter opens. A flow of hydraulic fluid is produced through the control duct 19, so that there is a lower pressure in the latter and in the proportionate annular chamber 17b than in the remaining interior of the valve arrangement. The reason for this is that, for example, as it flows through the radial gap between the control flange 13 of the throttle slide 10 and the internal diameter of the annular chamber 19, a pressure loss arises, which depends on the gap width and gap length. In addition, the radial openings 38 already mentioned or the axial openings 39, as orifices of appropriately small design, can assist this effect or exert it on their own. The pressure loss disrupts the force equilibrium and, if it is large enough, has the effect that the unit of the telescopic tube comprising the throttle slide 10 and the valve piston 21, which forms the throttling element, is displaced in the direction of the longitudinal duct 3 counter to the action of the slide spring 20. The flow through the transverse duct 2 to the longitudinal duct 3 is consequently throttled in the intended way.

During this process, the relative position of the valve piston 21 in relation to the throttle slide 10 remains unchanged; this is because the pressure which is present in the longitudinal duct 3 and is lower than the pressure in the transverse duct 2 continues to act in the interior of the valve arrangement. The end face of the closure plate 24 facing the longitudinal duct 3 is located increasingly in the region of the throttled flow, so that the pressure upstream of the closure plate will always become lower than the external pressure prevailing in the region of the transverse duct. The hydraulic fluid under higher pressure in the region of the transverse duct 2, which acts on the telescopic tube with the effect of extending it, therefore prescribes the excursion. In the extreme case, the closure plate can come as far as the opening of the longitudinal duct 3 or enter the latter. However, intermediate positions between the states shown in FIGS. 1 and 3 are also possible.

Figure 3:
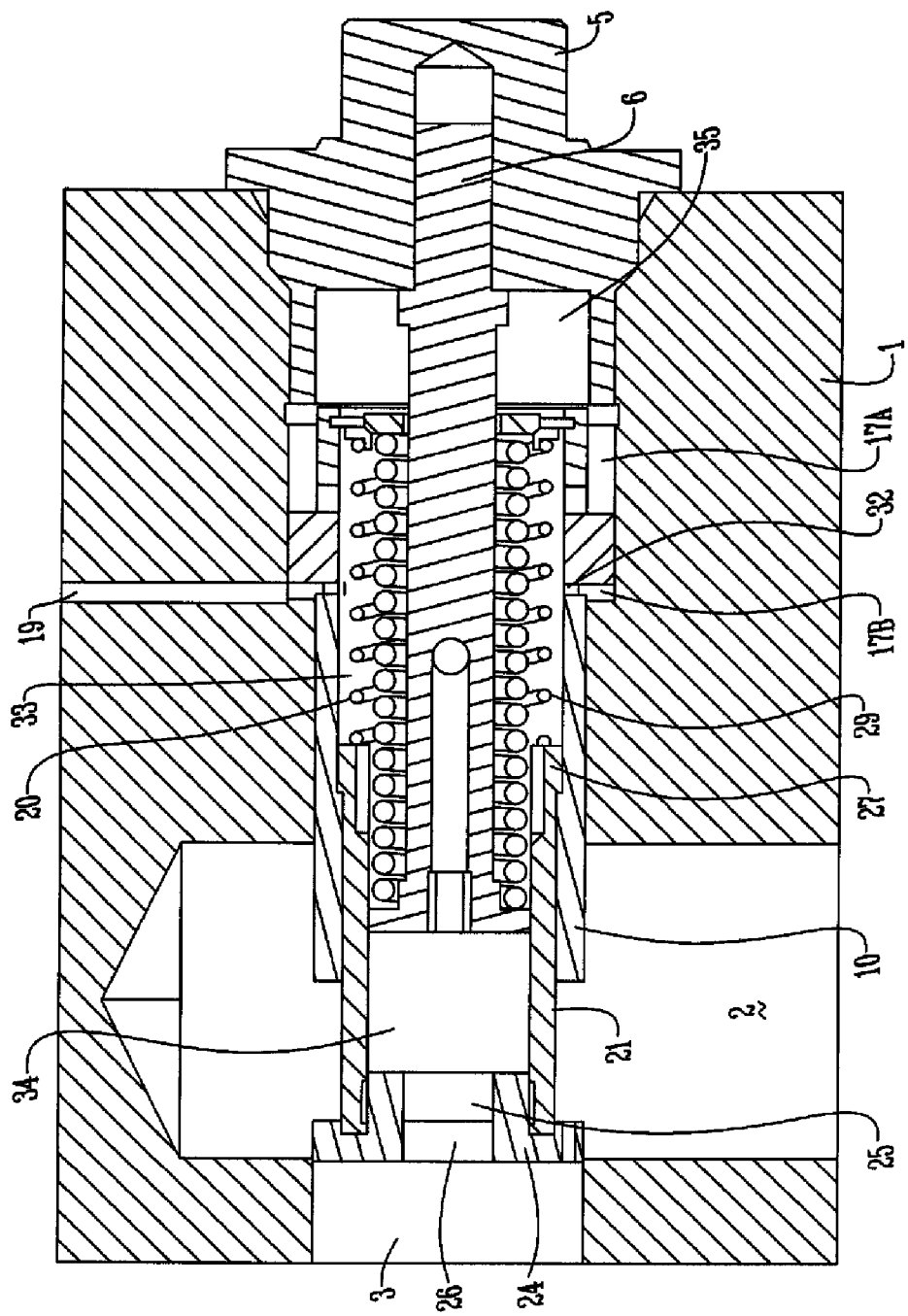
FIG. 3 illustrates a longitudinal section corresponding to FIG. 1, but with the valve arrangement being in the controlled throttling state.

When the telescopic tube comprising the throttle slide 10 and the valve piston 21 has reached the position illustrated in FIG. 3, the pressure of the hydraulic fluid upstream of the closure plate 24 falls still further as a result of the throttling achieved thereby. Therefore, the pressure limiting valve will ultimately close again and a uniform pressure will build up again in the entire interior of the valve arrangement. The force of the slide spring 20 is then sufficient to open the valve and to produce the connection between the transverse duct 2 and the longitudinal duct 3 to such an extent that the pressure in the longitudinal duct 3 rises again. The pressure in the longitudinal duct 3 is controlled in this way. The valve arrangement therefore fulfils its purpose of throttling the flow of the hydraulic fluid entering the transverse duct 3 and of converting its flow energy partly into heat.

If the flow under increased pressure takes place in the opposite flow direction, that is to say from the longitudinal duct 3 to the transverse duct 2, a throttling action is not desired. In this case, starting from the initial position according to FIG. 1, although the unit of the telescopic tube comprising the throttle slide 10 and the extended valve piston 21 will initially move out in the direction of the longitudinal duct 3 and therefore throttle the flow because, under the increased pressure in the interior of the valve arrangement, the pressure limiting valve also opens again this time, the undesired throttling action is ended immediately, since the valve piston 21 then moves into the throttle slide 10. This is because the closure plate 24 has then largely closed the longitudinal duct 3. The pressure in the longitudinal duct 3 thus acts on the entire end face of the closure plate 24. From the other side, however, this pressure acts only on an area which is determined by the internal diameter $D_{11}$ of the throttle slide 10. The forces which consequently act on the valve piston 21 as a result of the pressure in the longitudinal duct 3 are partly cancelled as a result. A first remaining force is the resulting force as a consequence of the pressure in the longitudinal duct 3 on the valve piston 21; it is given by the action of the pressure on an annular surface on the valve piston 21, which can be described by the external diameter $D_{24}$ of the closure plate 24 and the internal diameter $D_{11}$ of the throttle slide 10, which is equal to the external diameter of the tubular stem of the valve piston 21. This force acts against the valve piston 21 and the force holding the latter of the valve piston spring 29 in the direction of the closure screw 5.

A second force is generated as a consequence of the pressure in the transverse duct 2 on the valve piston 21; it is given by the action of this pressure on an annular surface, which can likewise be described by the external diameter $D_{24}$ of the closure plate 24 and the internal diameter $D_{11}$ of the throttle slide 10. This second force acts in the direction away from the closure screw 5 towards the longitudinal duct 3.

If the pressure in the longitudinal duct 3 is sufficiently higher than the pressure in the duct 2, the first force on the valve piston 21 resulting from the pressure in the longitudinal duct 3 thus predominates both over the second force from the pressure in the transverse duct 2 and the force of the slide spring 20, so that the valve piston 21 is displaced telescopically into the throttle slide 10.

The throttle slide 10, on the other hand, remains moved out in the direction of the longitudinal duct 3, because of the force equilibrium acting on it under specific conditions. Here, three hydraulic forces act on the throttle slide 10. Firstly, as a first force, the pressure in the transverse duct 2 on the throttle slide 10 acts on an annular surface whose external diameter is equal to the internal diameter $D_4$ of the holding and guiding bore and equal to the external diameter of the throttle slide 10 in this region and whose internal diameter is equal to the internal diameter $D_{11}$ of the throttle slide. The force resulting from this acts on the throttle slide 10 in the same direction as the force of the slide spring 20, in the direction of the closure screw 5. Acting as the second force, likewise in the same direction as this force, is the pressure in the proportionate annular chamber 17b, which is influenced by the pressure limiting valve on the control duct 19. The external diameter of the annular surface which acts in this case can be described by the external diameter $D_{13}$ of the control flange 13 on the throttle slide 10, which is equal to the internal diameter of the holding and guiding bore in the region of the annular chamber 17. The internal diameter of the annular surface is equal to the external diameter $D_{10}$ of the throttle slide 10. The decisive third force, which keeps the throttle slide moved out, is generated from the pressure in the longitudinal duct 3 which, as already described above, acts as far as the proportionate annular chamber 17a.

Figure 4:
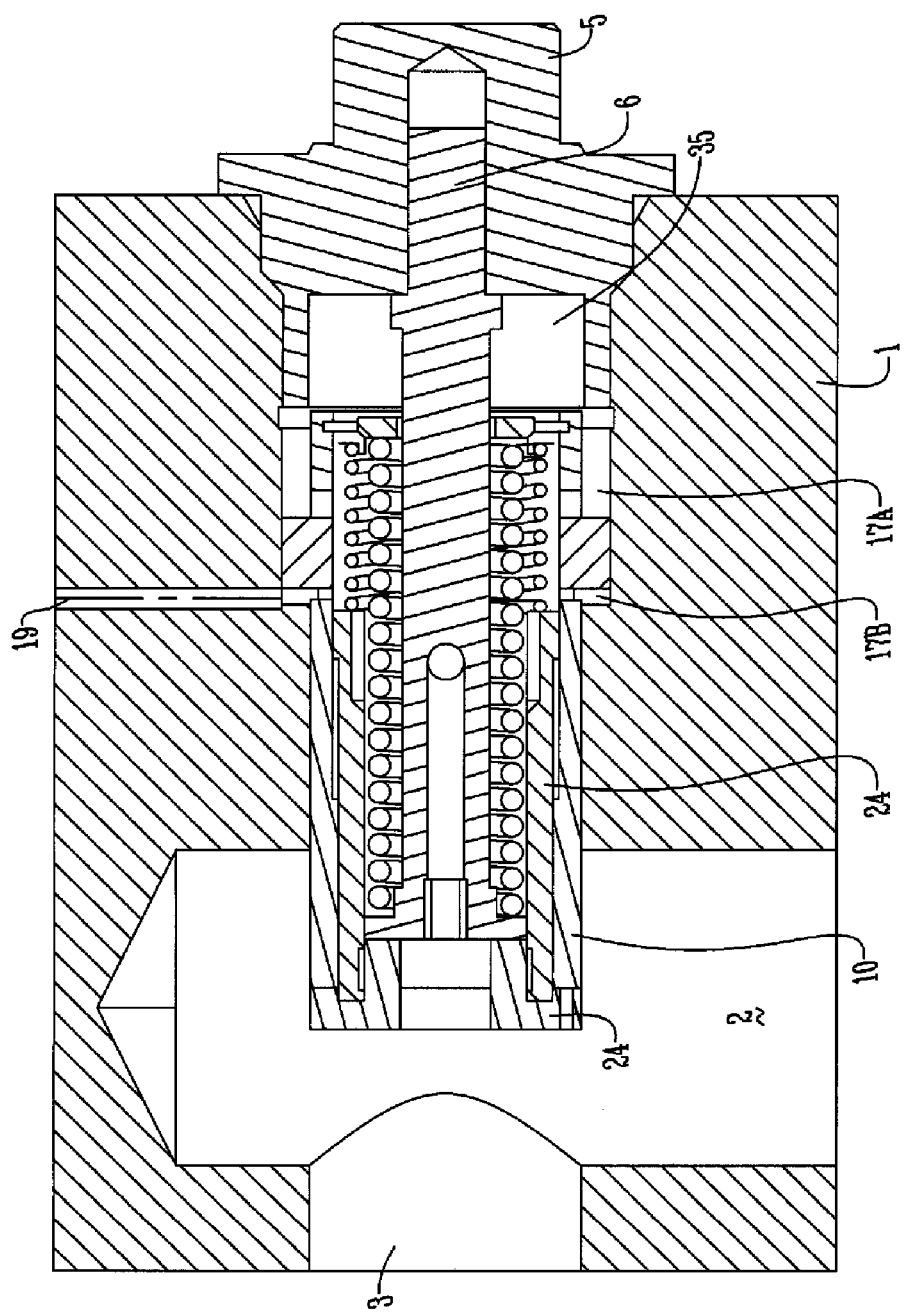
FIG. 4 reproduces the "switched throttling state" of the valve arrangement according to the invention in the illustration of the same longitudinal section as previously.

It acts on an annular surface whose external diameter is equal to the external diameter $D_{13}$ of the control flange 13 on the throttle slide 10 in this region and whose internal diameter is equal to the internal diameter $D_{11}$ of the throttle slide. The throttle slide 10 remains moved out if the pressure in the longitudinal duct 3 for this purpose is sufficiently higher than the pressure in the transverse duct 2. This state is illustrated in FIG. 4. The throttling action of the telescopic tube comprising the throttle slide 10 and the valve piston 21 is therefore virtually completely cancelled again, since the throttling element, that is to say the telescopic tube, is shorter, and no control takes place either.

If, finally, the supply of hydraulic fluid under pressure to the longitudinal duct 2 is stopped, then the valve arrangement assumes the initial position according to FIG. 1 again.

Consequently, the valve arrangement described acts as a throttling valve only when the hydraulic fluid is flowing through the transverse duct 2 to the longitudinal duct 3 and at the same time is under a pressure which lies above the threshold value at which the pressure limiting valve responds via the control duct 19. In the case of the opposite flow direction, that is to say from the longitudinal duct 3 to the transverse duct 2, on the other hand, no throttling action takes place even if the hydraulic fluid is under a pressure which is higher than the threshold value for the pressure limiting valve. In the case of pressures below the threshold value, the throttling element comprising the throttle slide 10 and the valve piston 21 assumes the initial position according to FIG. 1, in which the throttle slide 10 is retracted into the closure screw 5 and thus a throttling action likewise does not take place, specifically irrespective of the direction in which the hydraulic fluid may flow through the valve arrangement.

From the preceding description it now also becomes clear how the valve arrangement described is to be incorporated in the closed hydraulic circuit of a hydraulic vehicle drive. Specifically, the longitudinal duct 3 must be connected to the variable displacement pump and the transverse duct 2 must be connected to the line leading to the hydraulic motor. When hydraulic fluid under high pressure is conveyed from the variable displacement pump to the hydraulic motor, the valve arrangement remains ineffective, since the throttling element is shortened. However, in the case of travel in the opposite direction, when the line provided with the valve arrangement according to the invention is the return line, through which the hydraulic fluid flows back from the hydraulic motor to the variable displacement pump, the valve arrangement remains ineffective only as long as the normal traction operation prevails and the hydraulic fluid thus flows back from the hydraulic motor to the variable displacement pump under reduced pressure. However, as soon as the vehicle changes to trailing or overrun operation, the increased pressure of the hydraulic fluid that builds up in the transverse duct 2 has the effect that the pressure limiting valve opens and therefore the throttle slide 10 changes into its extended position in the direction of the longitudinal duct 3. The intended throttling action then occurs, a considerable part of the flow energy being converted into heat. This state is self-regulating, depending on the volume and pressure of the hydraulic fluid flowing back, and protects the diesel engine and the variable displacement pump reliably against overrunning.

In the following text, a few additional structural modifications, which can likewise be expedient in the valve arrangement according to the invention, will be mentioned.

The external diameter $D_{24}$ does not necessarily have to be exactly the same size as the external diameter $D_{10}$ of the throttle slide at its outer end. Very small diameter differences, which are then expressed in different diameters of the holding and guiding bore 4 and also of the longitudinal duct 3, can help to stabilize the valve arrangement. In this case, it can primarily be expedient to design the external diameter $D_{24}$ of the closure plate to be smaller than the external diameter $D_{10}$ of the throttle slide at the outer end of the latter. In general, however, good results can be expected if the two diameters are designed to be equally large.

Stable flow conditions are most easily established if the L shape of the duct arrangement is maintained strictly, the transverse duct 2 thus runs exactly at right angles to the longitudinal duct 3. It is likewise important for the holding and guiding bore 4 to run exactly in the axial direction of the longitudinal duct 3.

The openings leading to the proportionate annular chamber 17b, that is to say the radial openings 38, the axial openings 39 and the radial play between the control flange 13 and the internal diameter of the annular chamber 17 should be kept as small as possible, in order that, firstly, the intended throttling action for controlling the throttle slide 10 is brought about reliably, but on the other hand the power loss does not become too high. An excessively high power loss can have a disruptive effect in particular when hydraulic fluid under high pressure flows through the longitudinal duct 3 to the transverse duct 2. In the case of a vehicle drive, this can be expressed in an unpleasant manner in an excessively low speed of the vehicle.

The valve arrangement according to the invention initially offers two functions: in one flow direction, it provides a free through flow and in the opposite flow direction a throttling action. A third function can be added if the closure plate 24 is provided with openings 40 on its circumference which do not permit completely sealed isolation of transverse duct 2 and longitudinal duct 3. These openings 40 can be, for example, recesses in the manner of notches or through holes. In this case, a bypass action is also added to the throttling action and is effective in both flow directions but has a positive effect in particular in the case of a flow from the transverse duct 2 to the longitudinal duct 3.

What is claimed is:

1. Valve arrangement in a hydraulic circuit, having an L-shaped duct arrangement, in which a throttling element whose length can be adjusted can be displaced in the direction of one arm of the L-shaped duct arrangement in accordance with the position of a pilot control valve, the adjustment of the length of the throttling element being made under the influence of the hydraulic fluid entering its interior and the design being such that the throttling element is pushed into the duct when a specific threshold pressure of the hydraulic fluid is exceeded, irrespective of the flow direction of the hydraulic fluid, but its length is shortened when the inflow from a longitudinal duct (3) to a transverse duct (2) takes place at a pressure higher than the threshold pressure such that throttling action does not occur; said valve arrangement, in which the L-shaped duct arrangement in a stationary part (1) is formed by the longitudinal duct (3) and the transverse duct (2) connected thereto and running transversely with respect thereto and in which, in the axial direction of the longitudinal duct (3), on the side opposite the transverse duct (2), there is a holding and guiding bore (4) for the throttling element, which has a throttle slide (10) and a valve piston (21), having the following features:

a) in the holding and guiding bore (4), the tubular throttle slide (10) is arranged such that it can be displaced in a manner limited by a stop, projects with its outer end in the direction of the longitudinal duct more or less into the transverse duct (2) and, depending on the position of this end, narrows the cross section of the connection of the transverse duct (2) to the longitudinal duct (3) in a more or less throttling manner, and is prestressed by a slide spring (20) supported on the stationary part (1) with the effect of an inward movement into the stationary part (1) which opens the flow cross section;

b) in the outer region, open at the end, of the tubular throttle slide (10), the valve piston (21) is accommodated so that it can be displaced longitudinally in a manner limited by a stop and, with its outwardly facing piston crown (23) matched to the inlet opening of the longitudinal duct (3), can reduce the open cross section of this inlet opening, has an interior (34) which is connected hydraulically to the longitudinal duct (3) via a passage (25) in the piston crown (23), and is prestressed by a valve piston spring (29) supported on the throttle slide (10) with the effect of its outward movement;

c) over part of its longitudinal extent, the holding and guiding bore (4) of the stationary part (1) is formed as an annular chamber (17) which surrounds the throttle slide (10) and is subdivided by a control flange (13) located on the throttle slide (10) into two proportionate annular chambers (17a) and (17b), which are both connected hydraulically to the interior (33) of the throttle slide (10) and of which the outer proportionate annular chamber (17b), located on the side of the valve piston (21), is connected to a pressure limiting valve forming the pilot control valve;

d) the interiors (33, 34) of the tubular throttle slide (10) and of the valve piston (21) are likewise connected hydraulically to each other.

2. Valve arrangement according to claim 1, in which the connection between the outer proportionate annular chamber (17b), located on the side of the valve piston (21), and the interior (33) of the throttle slide (10) is produced by the play between the external diameter of the control flange (13) and the internal diameter of the annular chamber (17), via the inner, proportionate annular chamber (17a) formed on the opposite side of the control flange (13).

3. Valve arrangement according to claim 1, in which the connection between the outer proportionate annular chamber (17b), located on the side of the valve piston (21), and the interior (33) of the throttle slide (10) is produced by radial openings (38) in the wall of the throttle slide (10).

4. Valve arrangement according to one of claim 1, in which the connection between the outer proportionate annular chamber (17b), located on the side of the valve piston (21), and the interior (33) of the throttle slide (10) is produced by axial openings (39) in the control flange (13) of the throttle slide (10) and thus via the inner proportionate annular chamber (17a).

5. Valve arrangement according to one of claim 1, having a design such that the connection between the outer proportionate annular chamber (17b), located on the side of the valve piston (21), and the interior (33) of the throttle slide (10) is reduced in its cross section by the displacement of the throttle slide (10).

6. Valve arrangement according to one of claim 1, in which the outer proportionate annular chamber (17b), located on the side of the valve piston (21), is connected to the pressure limiting valve via a control duct (19).

7. Valve arrangement according to one of claim 1, in which the connection cross sections between the outer proportionate annular chamber (17b), located on the side of the valve piston (21), and the interior (33) of the throttle slide (10) are smaller than the corresponding connection cross sections for the inner proportionate annular chamber (17a), which is formed on the opposite side of the control flange (13).

8. Valve arrangement according to one of claim 1, having a slide spring (20) in the form of a helical spring, and having a closure screw (5) which seals off the holding and guiding bore (4) from the outside in a pressure-tight manner and on which there is a tie rod (6) which projects at least as far as the interior (33) of the throttle slide (10) but preferably as far as the interior (34) of the valve piston (21) and whose end is formed as a spring disc (7) for the slide spring (20) surrounding the tie rod (6).

9. Valve arrangement according to claim 8, in which the tie rod (6) is fixed in the closure screw (5) by a screw thread (8).

10. Valve arrangement according to claim 8 with a formation of the throttle slide (10) and of the valve piston (21) in the manner of a telescopic tube, there being fixed to the end of the throttle slide (10) that faces the closure screw (3) a multiple spring disc (15), on which, in a concentric arrangement, a slide spring (20) and the valve piston spring (29), both formed as helical springs, are supported.

11. Valve arrangement according to one of claim 8, in which the stop limitation for the longitudinal movement of the throttle slide (10) is carried out by a control flange (13) which is located on its outer circumference and of which one control face (13a) comes into contact with the inner end (18) of the closure screw (5) and the other control face (13b) comes into contact with an annular stop (16) that limits the annular chamber (17).

12. Valve arrangement according to one of claim 8, in which the stop limitation for the longitudinal movement of the throttle slide (10) against the closure screw (5) is carried out by its annular end face (36), which comes into contact with an inner end face (37) of the closure screw (5).

13. Valve arrangement according to one of claim 8, having a circularly cylindrical recess (35) which is located on the inner side of the closure screw (5) and which accommodates the end of the throttle slide (10) projecting beyond the control flange (13) during its inward movement.

14. Valve arrangement according to one of claim 1, in which the piston crown (23) of the valve piston (21) is connected to a tubular stem (22) guided in the throttle slide (10) and has a closure plate (24) whose external contour is matched to the internal contour of the longitudinal duct (3) and, when it moves out of the throttle slide (10), reduces the inlet cross section of the longitudinal duct (3) by approaching the latter or by moving into the latter.

15. Valve arrangement according to claim 14, in which the external diameter of the closure plate (24) is equal to the external diameter of the throttle slide (10) at its outer end.

16. Valve arrangement according to claim 14, in which the external diameter of the closure plate (24) is smaller than the external diameter of the throttle slide (10) at its outer end.

17. Valve arrangement according to one of claim 14, in which the stop limitation of the longitudinal movement of the valve piston (21) as it moves out of the throttle slide (10) is carried out by an outwardly projecting stop collar (27) at the end of the tubular stem (22), which strikes an inner step (12) on the throttle slide (10).

18. Valve arrangement according to one of claim 1, the piston crown (23) having openings (40) on its circumference which do not permit completely sealed isolation of transverse duct (2) and longitudinal duct (3).

19. A valve arrangement according to claim 1 including use in a closed circuit of a hydraulic drive.

20. Valve arrangement according to claim 1 for controlling a hydraulic vehicle drive, having a closed hydraulic circuit which has a variable displacement pump driven by a diesel engine, a hydraulic motor driving the drive wheels of the vehicle and lines connecting the variable displacement pump and the hydraulic motor for the hydraulic fluid, it being possible for each of the lines to be the flow or return line of the hydraulic motor, depending on the direction of travel of the vehicle.

* * * * *